United States Patent
Gauvreau et al.

(10) Patent No.: US 8,631,228 B2
(45) Date of Patent: *Jan. 14, 2014

(54) HITLESS MANUAL CRYPTOGRAPHIC KEY REFRESH IN SECURE PACKET NETWORKS

(75) Inventors: Richard Gauvreau, Aylmer (CA); Michael Aalders, Nepean (CA); Kim Edwards, Orleans (CA)

(73) Assignee: Rockstar Consortium US LP, Plano, TX (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/299,997

(22) Filed: Nov. 18, 2011

(65) Prior Publication Data

US 2012/0066491 A1    Mar. 15, 2012

Related U.S. Application Data

(63) Continuation of application No. 12/482,187, filed on Jun. 10, 2009, now Pat. No. 8,082,441, which is a continuation of application No. 10/740,416, filed on Dec. 22, 2003, now Pat. No. 7,581,093.

(51) Int. Cl.
*H04L 29/06* (2006.01)

(52) U.S. Cl.
USPC ........... 713/153; 713/160; 713/176; 713/180; 726/3; 726/12; 726/13; 726/14; 380/28; 380/278

(58) Field of Classification Search
None
See application file for complete search history.

(56) References Cited

U.S. PATENT DOCUMENTS

| | | |
|---|---|---|
| 4,850,017 A | 7/1989 | Matyas, Jr. et al. |
| 6,438,612 B1 | 8/2002 | Ylonen et al. |
| 2001/0047487 A1 | 11/2001 | Linnakangas et al. |
| 2002/0154782 A1 | 10/2002 | Chow et al. |
| 2003/0044020 A1 | 3/2003 | Aboba et al. |
| 2005/0021946 A1* | 1/2005 | Narayanan .................... 713/163 |

OTHER PUBLICATIONS

J. Moy, Open Shortest Path First (OSPF) Version 2—Request for Comment (RFC) 2328; Apr. 1998, pp. 1-245.*
F. Baker, B. Lindell, M. Talwar , The Resource Reservation Protocol (RSVP) Cryptographic Authentication—Request for Comments (RFC) 2747; Jan. 2000, pp. 1-22.*
F. Baker Cisco, B. Lindell USC/ISI, M. Talwar Microsoft, "The Resource Reservation Protocol (RSVP) Cryptographic Authentication", RFC 2747, Jan. 2000 http://www.ietf.org/rfc/rfc2747.txt.
J. Moy, Open Shortest Path First (OSPF) Version 2—Request for Comments (RFC) 2328 http://www.ietf.org.rfc/rfc2328.txt.

(Continued)

*Primary Examiner* — Edan Orgad
*Assistant Examiner* — Canh Le

(57) ABSTRACT

In a hitless manual cryptographic key refresh scheme, a state machine is independently maintained at each network node. The state machine includes a first state, a second state, and a third state. In the first state, which is the steady state, a current cryptographic key is used both for generating signatures for outgoing packets and for authenticating signatures of incoming packets. In the second state, which is entered when a new cryptographic key is provisioned, the old (i.e. formerly current) key is still used for generating signatures for outgoing packets, however one or, if necessary, both of the old key and the newly provisioned key is used for authenticating signatures of incoming packets. In the third state, the new key is used for generating signatures for outgoing packets and either one or both of the old key and new key are used for authenticating signatures of incoming packets.

18 Claims, 5 Drawing Sheets

(56) References Cited

OTHER PUBLICATIONS

Canh Le, USPTO Office Communication dated Oct. 12, 2010 in relation to U.S. Appl. No. 12/482,187, filed Jun. 10, 2009.
Canh Le, USPTO Office Communication dated Aug. 4, 2011 in relation to U.S. Appl. No. 12/482,187, filed Jun. 10, 2009.
Canh Le, USPTO Office Communication dated Apr. 16, 2007 in relation to U.S. Appl. No. 10/740,416, filed Dec. 22, 2003.
Canh Le, USPTO Office Communication dated Oct. 3, 2007 in relation to U.S. Appl. No. 10/740,416, filed Dec. 22, 2003.
Canh Le, USPTO Office Communication dated Jun. 25, 2008 in relation to U.S. Appl. No. 10/740,416, filed Dec. 22, 2003
Canh Le, USPTO Office Communication dated Dec. 19, 2008 in relation to U.S. Appl. No. 10/740,416, filed Dec. 22, 2003.
Canh Le, USPTO Office Communication dated May 5, 2009 in relation to U.S. Appl. No. 10/740,416, filed Dec. 22, 2003.

\* cited by examiner

HITLESS MANUAL CRYPTOGRAPHIC KEY REFRESH IN SECURE PACKET NETWORKS

CROSS REFERENCE TO RELATED APPLICATIONS

This application is a continuation of previously filed application Ser. No. 12/482,187 filed Jun. 10, 2009, which is a continuation of application Ser. No. 10/740,416 filed Dec. 22, 2003, now issued U.S. Pat. No. 7,581,093. The contents of both prior applications are hereby incorporated by reference.

FIELD OF THE INVENTION

The present invention relates to secure packet networks, and more particularly to the refreshing of cryptographic keys in secure packet networks.

BACKGROUND OF THE INVENTION

Many packet-based networks employ cryptographic keys to authenticate the identity of the sender of each packet sent across a communications link between a source node (e.g. switch or router) and a destination node. The motivation for such schemes is usually a desire to protect against the injection of packets into the communications link by a hacker so as to fool the destination node that the injected packets came from a trusted source node.

In a typical scheme, a source node wishing to send encrypted or unencrypted data to a destination node first applies a hash function and a cryptographic key to the data to generate a signature. The data and the signature are both written to a packet and the packet is sent to the destination node. Upon receipt of the packet, the destination node applies the same hash function and cryptographic key to generate a local "authentication" signature. If the authentication signature matches the signature from the packet, the destination node treats the data as being authentic. The same approach is used for data sent in the opposite direction.

Packet-based networks which employ cryptographic keys and signatures are referred to as secure packet networks. Packet-based networks which do not employ cryptographic keys and signatures are referred to as non-secure packet networks.

Typically, cryptographic keys used in secure packet networks are periodically refreshed (i.e. changed). The refreshing of a cryptographic key may alternatively be referred to as re-keying or as the provisioning of a new key.

Keys may be refreshed manually or automatically. In manual key refreshing, a key distribution scheme is used to notify a human operator at each node in the secure packet network that the cryptographic key is due to be refreshed and to provide the new cryptographic key to be provisioned. In response, the operator at each node configures his or her node to use the provided key. In automatic key refreshing, the key refresh is triggered from one network location (e.g. at a Network Management Server or NMS) and is automatically propagated throughout the network. The present description pertains to manual key refreshing.

A number of manual key refreshing solutions are known. In a first known solution, when an operator provisions a new key at a given network node, the node immediately begins using the new key both for generating signatures for outgoing packets and for checking signatures of incoming packets. Disadvantageously, this solution may result in lost packets during key refresh. This is because the provisioning of a new key at a source node will result in a rejection of all of the packets from the source node at the destination node because the source is using the new key to generate outgoing signatures while the destination is still using the old key for authentication of incoming signatures (i.e. the signature in the packet and the locally generated authentication signature will no longer match). This rejection of packets will continue until the destination node is provisioned with the new key. Depending upon the nature of operative higher level communications protocols, a loss of service between the nodes may result.

Another known solution is described in the Open Shortest Path First (OSPF) 2 Request For Comments (RFC) 2328, in a section pertaining to cryptographic keys. RFC 2328 is presently posted at URL http://www.ietf.org/rfc/rfc2328.txt.

In overview, OSPF 2 addresses the problem of lost packets during key refresh by provisioning multiple keys with overlapping time windows during which each key is "live". Each provisioned key in OSPF 2 is assigned four timestamps: (1) the time at which the current node is to start sending packets containing signatures generated from the new key; (2) the time at which the current node is to start receiving packets containing signatures generated from the new key; (3) the time at which the current node is to stop sending packets containing signatures generated from the new key; and (4) the time at which the current node is to stop receiving packets containing signatures generated from the key. The timestamps are configured such that only one key is ever active for generating signatures for outgoing packets, yet they allow incoming packets to be authenticated at a destination node by any one of a number of currently active keys. The destination node will first attempt to authenticate using the first active key. If authentication fails, the node will then attempt to authenticate using the second active key, and so on, until either the packet is authenticated or there are no more keys. By appropriately configuring the timestamps of successive keys, manual key refresh can be achieved without lost packets even when a source node has begun using a new key for outgoing packets while the corresponding destination node is still using an old key for outgoing packets.

A disadvantage of OSPF 2 is the processing overhead which may result when a destination node is required to generate multiple authentication signatures during authentication. Since authentication is done for every received packet, the amount of processing power consumed at a destination node by this multiple authentication signature generation can be significant. The amount of overhead involved in generating four timestamps per key and distributing the timestamp information to an operator at each node in a network prior to each key refresh may also be considerable.

The Resource Reservation Protocol (RSVP) cryptographic authentication protocol described in RFC 2747 (http://www.ietf.org/rfc/rfc2747.txt) provides another known manual re-keying solution. This solution is similar to the OSPF 2 approach but uses fewer timestamps per key. This solution may suffer from similar disadvantages as OSPF 2, although likely to a lesser degree.

An alternative manual cryptographic key refresh solution would be desirable.

SUMMARY OF THE INVENTION

In a hitless manual cryptographic key refresh scheme, a state machine is independently maintained at each network node. The state machine includes a first state, a second state, and a third state. In the first state, which is the steady state, a current cryptographic key is used both for generating signatures for outgoing packets and for authenticating signatures of incoming packets. In the second state, which is entered when a new cryptographic key is provisioned, the old (i.e. formerly current) key is still used for generating signatures for outgoing packets, however one or, if necessary, both of the old key and the newly provisioned key is used for authenticating signatures of incoming packets. In the third state, the new key is used for generating signatures for outgoing packets and either one or both of the old key and new key are used for authenticating signatures of incoming packets.

In accordance with an aspect of the present invention there is provided in a system wherein cryptographic keys are manually refreshed, a network node adapted to: maintain a state machine including a first state, a second state, and a third state, said first state indicating use of a current cryptographic key for both generating signatures for outgoing packets and for authenticating signatures of incoming packets, said second state indicating use of said current cryptographic key for generating signatures for outgoing packets and use of at least one of said current cryptographic key and a new cryptographic key for authenticating signatures of incoming packets, said third state indicating use of said new cryptographic key for generating signatures for outgoing packets and use of at least one of said current cryptographic key and said new cryptographic key for authenticating signatures of incoming packets.

In accordance with another aspect of the present invention there is provided a computer-readable medium storing instructions which, when executed by a network node in a system wherein cryptographic keys are manually refreshed, cause said node to: maintain a state machine including a first state, a second state, and a third state, said first state indicating use of a current cryptographic key for both generating signatures for outgoing packets and for authenticating signatures of incoming packets, said second state indicating use of said current cryptographic key for generating signatures for outgoing packets and use of at least one of said current cryptographic key and a new cryptographic key for authenticating signatures of incoming packets, said third state indicating use of said new cryptographic key for generating signatures for outgoing packets and use of at least one of said current cryptographic key and said new cryptographic key for authenticating signatures of incoming packets.

In accordance with yet another aspect of the present invention there is provided a method for use at a network node in a system wherein cryptographic keys are manually refreshed, comprising: maintaining a state machine including a first state, a second state, and a third state, said first state indicating use of a current cryptographic key for both generating signatures for outgoing packets and for authenticating signatures of incoming packets, said second state indicating use of said current cryptographic key for generating signatures for outgoing packets and use of at least one of said current cryptographic key and a new cryptographic key for authenticating signatures of incoming packets, said third state indicating use of said new cryptographic key for generating signatures for outgoing packets and use of at least one of said current cryptographic key and said new cryptographic key for authenticating signatures of incoming packets.

In accordance with still another aspect of the present invention there is provided a network node adapted to: maintain a state machine including a first state, a second state, and a third state, said first state indicating that no signature is to be included in outgoing packets and that only incoming packets lacking a signature are to be considered authentic, said second state indicating that no signature is to be included in outgoing packets and that only incoming packets either lacking a signature or including a signature generated from a particular cryptographic key are to be considered authentic, said third state indicating that outgoing packets are to include a signature generated from said particular cryptographic key and that only incoming packets either lacking a signature or including a signature generated from said particular cryptographic key are to be considered authentic.

In accordance with yet another aspect of the present invention there is provided a computer-readable medium storing instructions which, when executed by a network node, cause said node to: maintain a state machine including a first state, a second state, and a third state, said first state indicating that no signature is to be included in outgoing packets and that only incoming packets lacking a signature are to be considered authentic, said second state indicating that no signature is to be included in outgoing packets and that only incoming packets either lacking a signature or including a signature generated from a particular cryptographic key are to be considered authentic, said third state indicating that outgoing packets are to include a signature generated from said particular cryptographic key and that only incoming packets either lacking a signature or including a signature generated from said particular cryptographic key are to be considered authentic.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
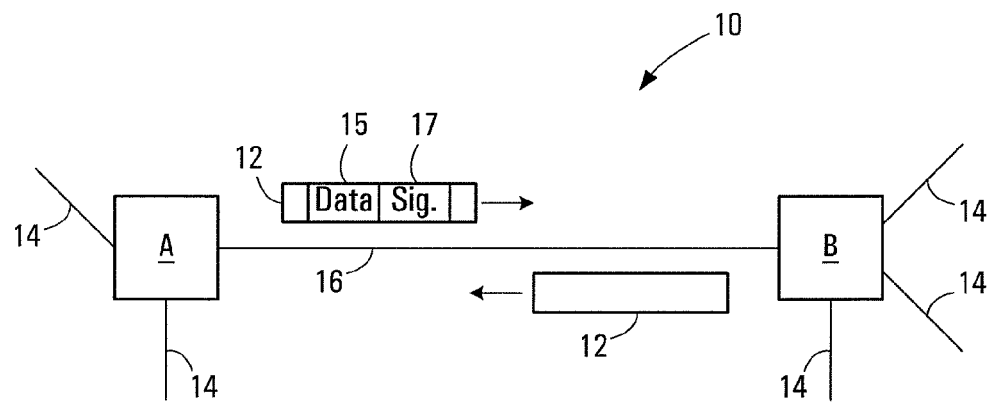
FIG. 1 is a schematic diagram illustrating a portion of a secure packet-based communications network.

Referring to FIG. 1, a portion of a secure packet-based communications network is illustrated generally at 10. The illustrated portion of network 10 has two nodes A and B. Nodes A and B may be switches or routers, for example, which are capable of switching or routing packets through the network 10. The term "packet" as used herein is understood to refer to any fixed or variable size grouping of bits, i.e. a Protocol Data Unit, and as such may refer to cells (ATM) or frames (Frame Relay) for example.

Nodes A and B are interconnected by a link 16. Link 16 may for example be a physical interconnection comprising optical fibre, coaxial cable or another transmission medium. Alternatively, link 16 may be a logical interconnection. Nodes A and B are also interconnected to other network nodes (not illustrated) via links 14.

Each of nodes A and B employs a cryptographic key to generate signatures for outgoing packets and to authenticate signatures in incoming packets. At a source node (e.g. node A), outgoing data 15 (which may either be encrypted or unencrypted) is hashed using a hash function, and the cryptographic key is applied to generate a signature 17. The data 15 and signature 17 are written to a packet 12 and the packet 12 is sent. At the destination node (e.g. node B), the data 15 in the received packet 12 and a cryptographic key (or possibly more than one, as will be described) are used to generate another, local signature (referred to as the "authentication signature", which is compared to the received signature 17 to determine whether the data is authentic (a match indicating authenticity). This process is employed at every network node, and thus governs, e.g., both traffic from node A to node B and traffic from node B to node A.

To support a hitless manual cryptographic key refresh scheme, each of nodes A and B independently maintains a state machine which governs the periodic manual refreshing of the cryptographic key used at the node. This state machine is illustrated in FIG. 2.

Figure 2:
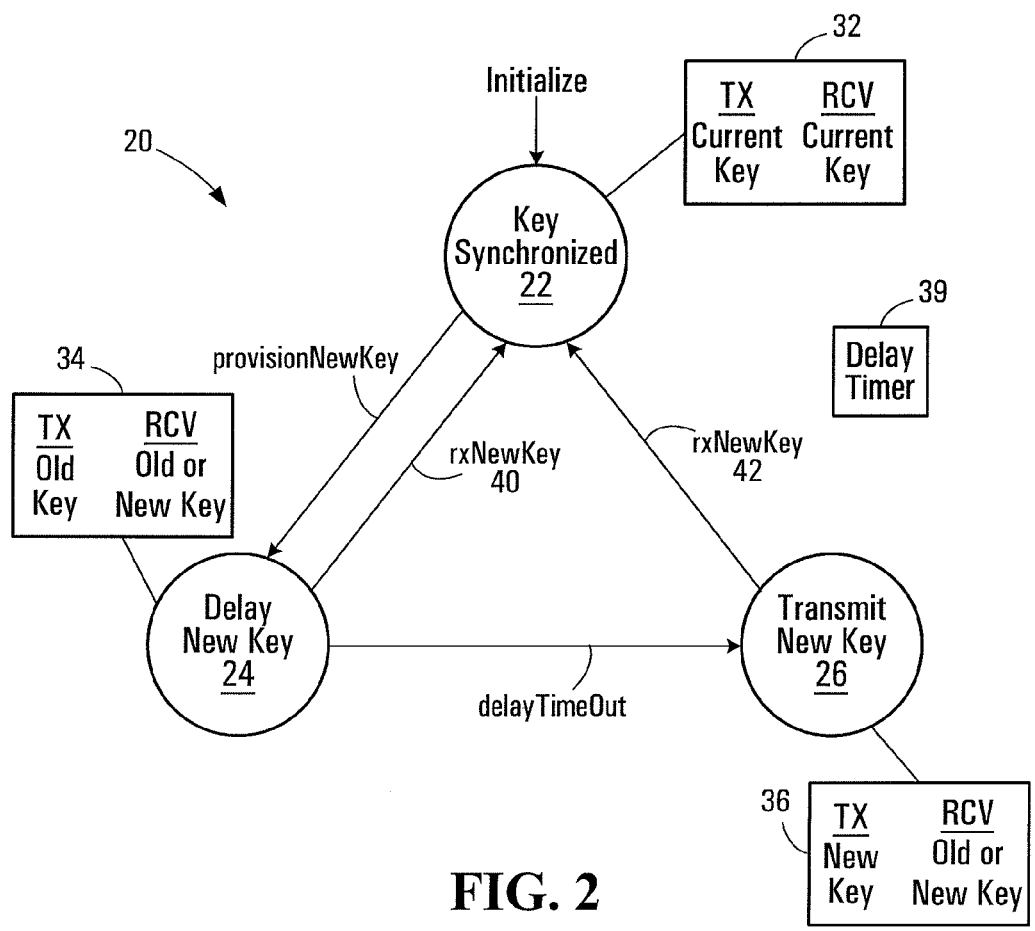
FIG. 2 illustrates a manual cryptographic key refresh state machine operative at each node of FIG. 1.

As shown in FIG. 2, state machine 20 consists of three states, namely, a first KeySynchronized state 22, a second DelayNewKey state 24, and a third TransmitNewKey state 26. Each state 22, 24, and 26 is associated with the use of a cryptographic key for generating signatures for outgoing ("TX") packets and with the use of one or more cryptographic keys for authenticating incoming ("RCV") packets, as summarized in tables 32, 34 and 36 (respectively) and described in greater detail below.

In the description which follows, the sending of a packet with a signature generated from a key X is referred to as "sending key X" and the receiving of a packet with a signature generated from a key X is referred to as "receiving key X". These shorthand terms are used for convenience and should not be understood to refer to the actual sending or receiving of key X.

The KeySynchronized state 22 represents the steady state. In this state, a single, current key K1 is used both for generating signatures for outgoing packets and for authenticating signatures in incoming packets, as shown in table 32. The KeySynchronized state 22 is the initial state upon node reset/initialization.

The DelayNewKey state 24 is the state to which a node is transitioned upon the provisioning of a new key K2. This state transition is labelled provisionNewKey in FIG. 2. When this state transition occurs, current key K1 becomes "old" key K1. A countdown or "delay" timer configured to expire after a delay period is also initiated when the DelayNewKey state 24 is entered. The delay period is the amount of time that the first node provisioned with a new key will wait before sending the new key K2. The purpose of the delay period is to allow time for other nodes to provision the same new key K2.

In the DelayNewKey state 24, the node still sends old key K1. However, the node now receives either old key K1 or new key K2, as shown in table 34. That is, for each incoming packet, the node first attempts to authenticate using key K1, and if authentication fails, it then attempts to authenticate using key K2. If either K1 or K2 generates a matching signature, the received data is considered to be authentic. As will be appreciated, this facilitates receipt of packets from other network nodes which are at various stages of manual key refresh.

Transitioning from the DelayNewKey state 24 to another state can occur in one of two ways.

First, if new key K2 is received from another node at any time before the delay timer expires, state will transition back to the KeySynchronized state 22 via the rxNewKey state transition 40. The purpose of this transition is essentially to return the node to a steady state of using only one key (i.e. new key K2) for both incoming and outgoing packets when there is evidence that another node has now been provisioned with the same new key K2. At the time of the transition, new key K2 is deemed to be "current" key K2.

Alternatively, if no new key K2 is received from another node during the delay timer interval, state will transition to the TransmitNewKey state 26 via the delayTimeOut state transition. This forces the node to begin to send the new key K2 even when there is no evidence that another node has been provisioned with the new key K2.

When the TransmitNewKey state 26 is entered, the delay timer at the node is stopped. When in the TransmitNewKey state 26, the node sends new key K2 but still receives either old key K1 or new key K2, as shown in table 36. The TransmitNewKey state 26 is maintained until the node receives new key K2 from another node. At that point, state will transition back to the steady state KeySynchronized 22 by way of the rxNewKey state transition 42, and new key K2 is deemed "current" key K2.

Figure 3:
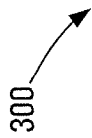
FIG. 3 illustrates state transitions at a pair of nodes of FIG. 1 during manual cryptographic key refresh.

Operation of the hitless manual cryptographic key refresh scheme in the network 10 is illustrated in FIG. 3. FIG. 3 illustrates, in the form of a table 300, state transitions at nodes A and B during an exemplary manual cryptographic key refresh cycle from a key K1 to a key K2. Each row of table 300 represents a combined state of nodes A and B. For each row, the state each node A and B is indicated. Also indicated for each node is the key presently being used to generate outgoing signatures ("TX key") and the key(s) being used to generate authentication signatures ("RCV key"). The last column of table 300 describes the event which causes a transition from the state of the current row to the state of the immediately following row.

Prior to the provisioning of the new cryptographic key K2, the network 10 is in a steady state, with each node A and B in the KeySynchronized state, using key K1 both for generating outgoing signatures and for authenticating incoming packets (row a).

Upon the provisioning of a new key K2 by an operator at node A, node A transitions to state DelayNewKey (row b). In state DelayNewKey, node A still uses old key K1 (i.e. what was formerly "current" key K1) to generate signatures for transmission. However, for authenticating incoming packets, key K1 or key K2 may be used. That is, when node A receives a packet, it will first try to authenticate the signature using key K1, and if authentication fails with key K1, it will then try authenticating the signature using key K2 (this order may be reversed, albeit with a possible reduction in efficiency). If either authentication succeeds, the incoming packet is considered valid. Since node B is still generating signatures using key K1, authentication at node A using key K1 will be successful. Transmission and authentication of packets from node A to node B is unchanged from row a.

Upon the transition of node A to the DelayNewKey state, a countdown timer is initiated at node A. The duration of the countdown timer is selected to allow sufficient time for an operator at the other node B to provision new key K2 at that node before timer expiry. This duration may be 20 or 30 seconds for example, although shorter or longer values may be warranted depending upon the delays inherent in the operative key distribution scheme used to notify operators at each node A and B of the new key K2.

Before the countdown timer expires at node A, a new key K2 is provisioned by an operator at node B. This causes node B to also transition to state DelayNewKey (row c) and to start its own countdown timer. At this stage, both nodes A and B are still sending signatures generated from key K1, and both nodes are authenticating incoming packets using key K1 or key K2.

Assuming that the countdown timers at both nodes are configured to have the same delay period, the timer at node A will expire first. When this occurs, node A transitions to the TransmitNewKey state (row d). As a result, node A becomes the first of the two nodes to begin sending signatures generated from the new key K2.

As soon as node B receives the first packet from node A containing a signature generated using new key K2, node B transitions from the DelayNewKey state directly to the steady state KeySynchronized (row e) without visiting state TransmitNewKey. This assumes that the packet from node A is received before the expiry of the countdown timer at node B. Node B now sends and receives new key K2 exclusively, and new key K2 is deemed to be "current" key K2 at node B.

Meanwhile, as soon as node A receives the first packet from node B containing a signature generated from new key K2, node A transitions from state TransmitNewKey to steady state KeySynchronized (row f). At this stage, both nodes are in the steady state, using key K2 exclusively as the "current" key for both transmission and authentication. Key refresh is thus completed. Advantageously, no packets were rejected due to failed authentication during the key refresh (i.e. the refresh was "hitless"). Moreover, no generation of timestamps, association of timestamps with cryptographic keys, or distribution of timestamps during key distribution is required.

The above description should of course not be understood to limit the present manual cryptographic key refresh scheme for use in refreshing keys at only two nodes in a network. The scheme is capable of updating the cryptographic key at a large number of network nodes.

In the event that the countdown timer at node B had been configured with a shorter time delay than the timer at node A, the timer at node B may have expired first. In this case, the states illustrated in row d to row f of table 300 (FIG. 3) for nodes A and B would be reversed (i.e. node B would visit states DelayNewKey and TransmitNewKey while node A would only visit state TransmitNewKey). This situation would typically not occur, however, because the timeout delays at each node are typically configured to be the same.

It will be recognized that the flow of at least some traffic during the manual refresh procedure is necessary for the refresh to be successful. This is because if no packets flow, it is not possible for each node to return to the KeySynchronized state 22 (since neither state transition rxNewKey 40 or 42 of FIG. 2 would be possible). However, because many communications protocols, which would typically operate at a higher level than the present scheme, periodically send a "keep alive" message, this is usually not a concern.

Figure 4:
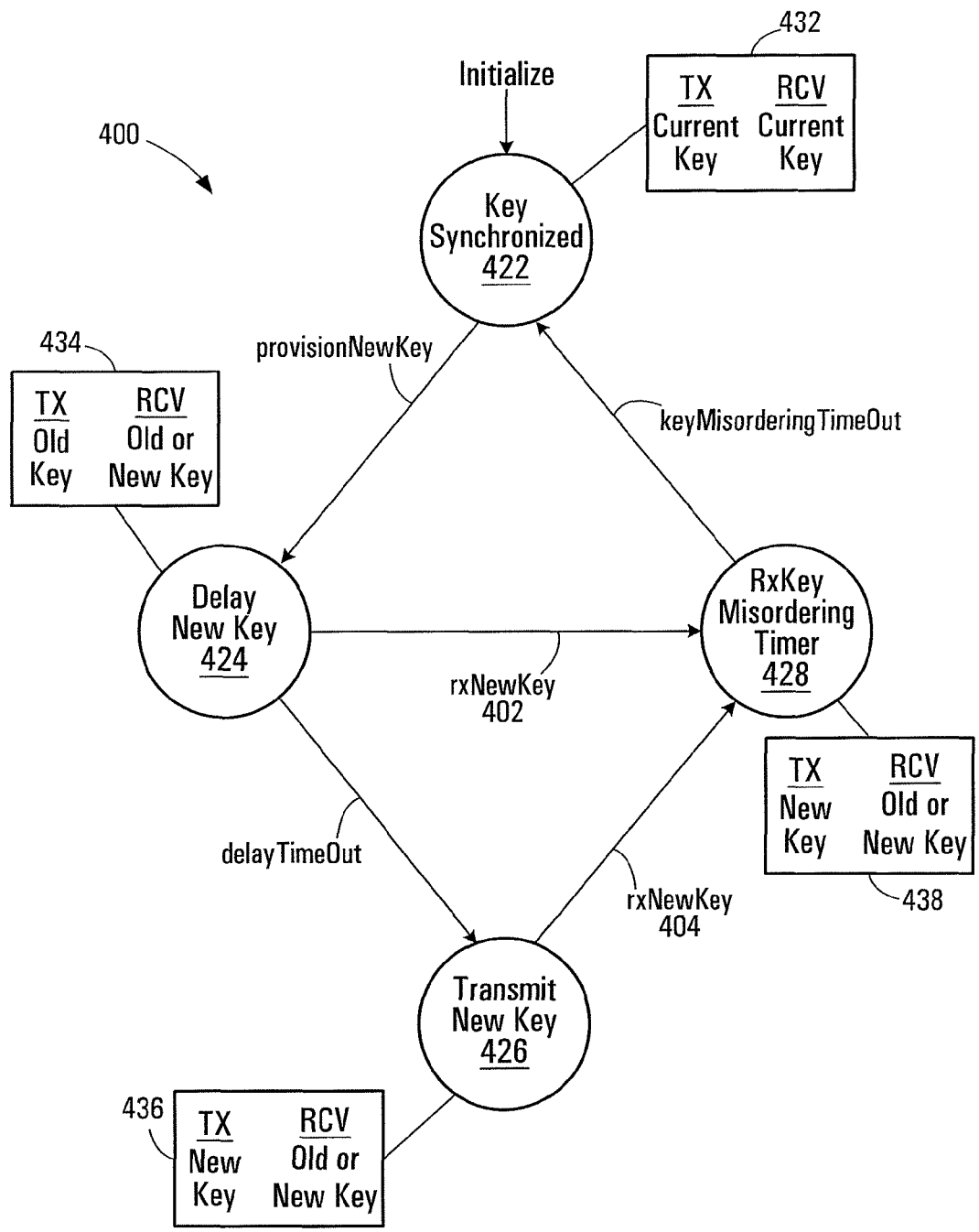
FIG. 4 illustrates an alternative manual cryptographic key refresh state machine which may be used in an alternative embodiment of the present invention.

FIG. 4 illustrates an alternative manual cryptographic key refresh state machine 400 which may be used in place of the state machine 20 of FIG. 2 at each node of an alternative embodiment of the present invention. The state machine 400 is able to handle the possibility of out-of-sequence packets between nodes. An example of out-of-sequence packets is when a first packet is sent at time 0 from a source node to a destination node and a second packet is sent at time N (>0) from the same source node to the same destination node yet the second packet arrives at the destination node before the first packet. A possible cause of out-of-sequence packets is the routing of separate packets along different network routes which introduce different transmission delays.

As shown in FIG. 4, state machine 400 consists of four states. The first three states, namely, the KeySynchronized state 422, DelayNewKey state 424, and TransmitNewKey state 426, are analogous to the identically names states 22, 24 and 26 of FIG. 2, having the same TX and RCV keys as those states, as shown in tables 432, 434, and 436 respectively. Like the state DelayNewKey 24 of FIG. 2, the DelayNewKey state 424 has a delay timer that is initiated when the state is entered.

The fourth RxKeyMisorderingTimer state 428 is a new state which serves as an interim state between the receipt of a new key K2 from another node and the transition back to the KeySynchronized steady state 422. This node is entered from the DelayNewKey state 424 upon the receipt of new key K2 from another node before the expiry of the delay timer (via the rxNewKey state transition 402) or from the TransmitNewKey state 426 upon the receipt of new key K2 from another node after the delay timer expires (via the rxNewKey state transition 404).

When the RxKeyMisorderingTimer state 428 is entered, a misordering timer (countdown timer) is initiated, and if the delay timer which was initiated in state DelayNewKey 424 is still running, the delay timer is stopped. The purpose of the misordering timer is to provide a period of time (referred to as the "overlap time period") after the receipt of a new key K2 during which a node will still receive either old key K1 or new key K2, and will send new key K2. This is shown in table 438. The overlap time period should be at least as long as the longest possible packet delay between source and destination nodes in the network 10. Upon expiry of the overlap time period, state returns to the KeySynchronized steady state 422 via state transition keyMisorderingTimeOut.

Operation of an embodiment employing the state machine 400 at each node is similar to the operation described above in conjunction with FIG. 3, except that both the source and destination node will visit the RxKeyMisorderingTimer state 428 prior to entering the KeySynchronized steady state 422, and will stay in the RxKeyMisordering-Timer state 428, receiving and authenticating packets that are either in sequence or out of sequence, until the overlap time period expires.

When a network node executes either state machine 20 (FIG. 2) or state machine 400 (FIG. 4), it is possible that an operator at the node may provision a new key twice in rapid succession, such that the second new key is provisioned before the node has settled back into the steady state KeySynchronized from the provisioning of the first new key. Such an occurrence may have the effect of putting the state machine 20 or 400 into an undefined state. To guard against this possibility, enhanced versions of state machines 20 and 400 respectively may be implemented. Such enhanced state machines are illustrated in FIGS. 5 and 6 at 500 and 600 respectively.

Figure 5:
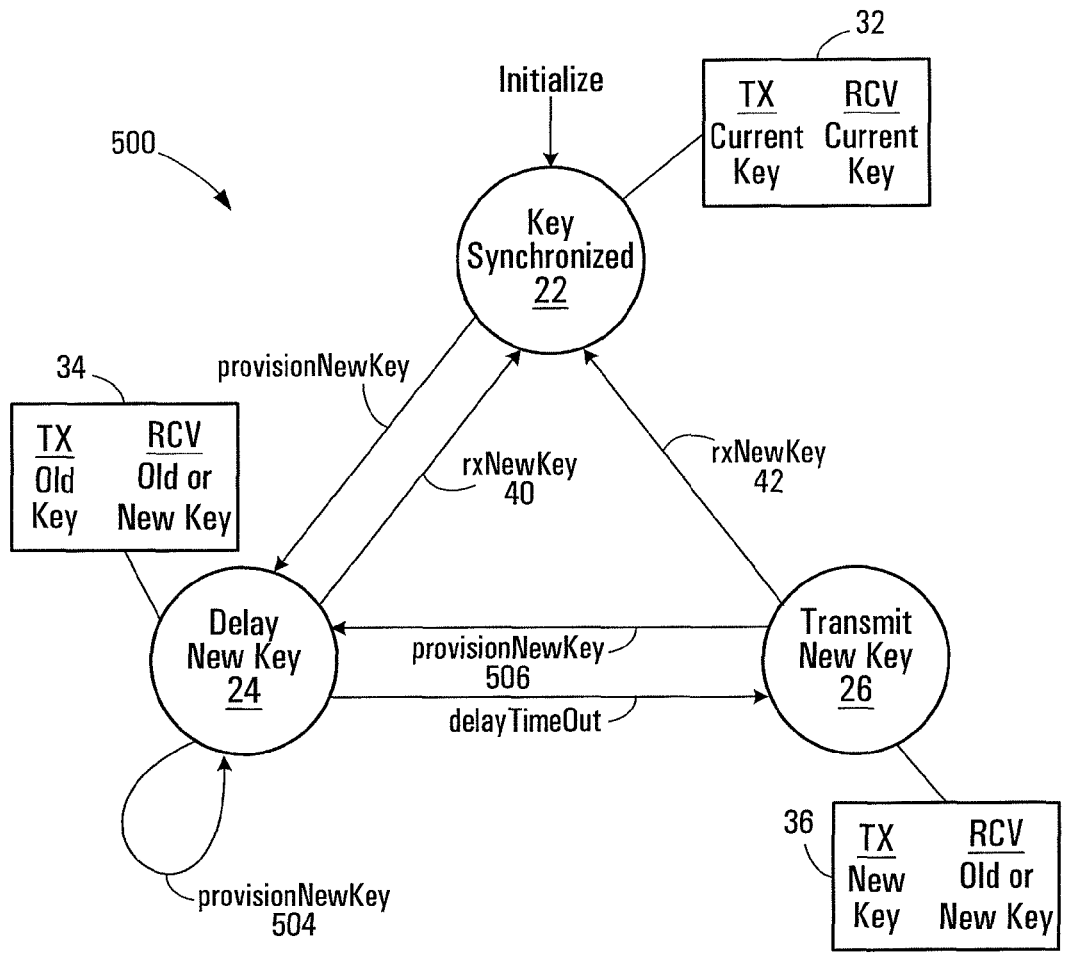
FIG. 5 illustrates another alternative manual cryptographic key refresh state machine which may be used in another alternative embodiment of the present invention.

As shown in FIG. 5, state machine 500 is the same as state machine 20 of FIG. 2. The only difference is the addition of two new state transitions. The first new state transition is a provisionNewKey state transition 504. This state transition 504 occurs when a new key K3 is provisioned when the node is in the DelayNewKey state 24 from the earlier provisioning of a new key K2. This transition 504 causes the delay timer to be restarted but leaves the node in the DelayNewKey state 24 (i.e. state transitions from state 24 back to state 24). In this case the new key K3 replaces key K2 as the "new key", with "old key" K1 remaining the same. The second new state transition is a provisionNewKey state transition 506. This state transition 506 occurs when a new key K3 is provisioned when the node is in the TransmitNewKey state 26 from the earlier provision of a new key K2. This transition 506 places the node in the DelayNewKey state 24 and starts the delay timer. In this case the new key K3 replaces key K2 as the "new key", and key K2 replaces key K1 as the "old key".

Operation of an embodiment employing state machine 500 at each node is similar the operation described above in conjunction with FIG. 3, except that if a second new key K3 is provisioned when a node is in either of states DelayNewKey 24 or TransmitNewKey 26 due to the earlier provisioning of a first new key K2, the node transitions to state DelayNewKey 24, and the delay timer is either restarted (if presently running) or started (if not presently running), as appropriate. As well, K3 replaces K2 as the "new key", and in the latter case, key K2 replaces key K1 as the "old key".

Figure 6:
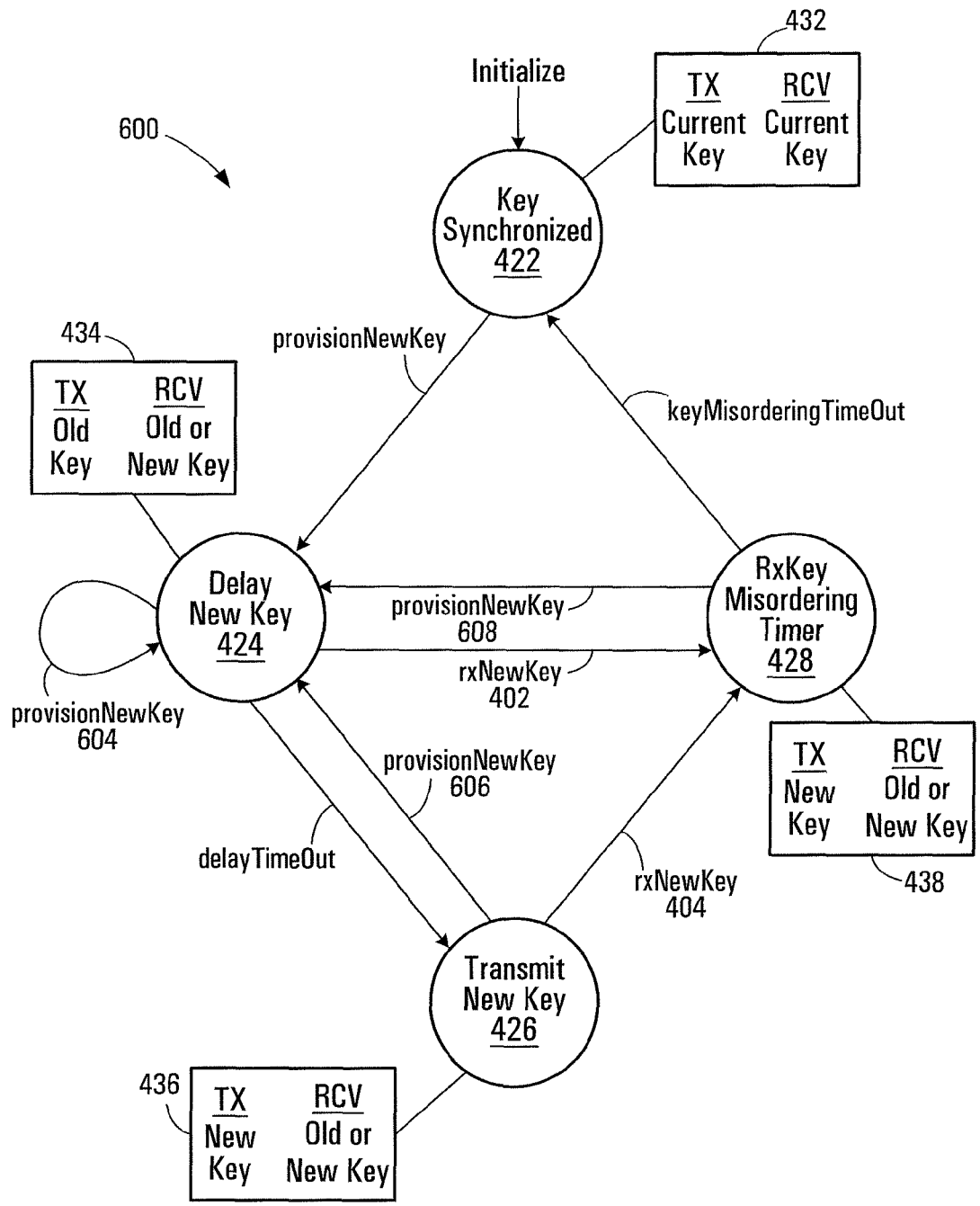
FIG. 6 illustrates yet another alternative manual cryptographic key refresh state machine which may be used in yet another alternative embodiment of the present invention.

Turning to FIG. 6, the illustrated state machine 600 is the same as state machine 400 of FIG. 4. The only difference is the addition of three new state transitions. The first new state transition is a provisionNewKey state transition 604. This state transition 604 occurs when a new key K3 is provisioned when the node is in the DelayNewKey state 424 from the earlier provisioning of a new key K2. This transition 604 causes the delay timer to be restarted but leaves the node in the DelayNewKey state 424. In this case the new key K3 replaces key K2 as the "new key", with "old key" K1 remaining the same. The second and third new state transitions are the provisionNewKey state transitions 606 and 608. These state transitions occur when a new key is provisioned when the node in the TransmitNewKey state 426 or RxKeyMisorderingTimer state 428 respectively. Transitions 606 and 608 place the node in the DelayNewKey state 424 and start the delay timer. As well, new key K3 replaces key K2 as the "new key", and key K2 replaces key K1 as the "old key". In the case of the provisionNewKey state transition 608, the misordering timer may be stopped.

Operation of an embodiment employing state machine 600 at each node is similar the operation of an embodiment employing state machine 400 (FIG. 4) as described above, except that if a second new key K3 is provisioned when a node is in either of states DelayNewKey 424, TransmitNewKey 426 or RxKeyMisorderingTimer 428 due to the earlier provisioning of a first new key K2, the node transitions to state DelayNewKey 424, and the delay timer is either restarted (if presently running) or started (if not presently running), as appropriate. As well, K3 replaces K2 as the "new key", and in the case of transitions from states TransmitNewKey 426 or RxKeyMisorderingTimer 428, key K2 replaces key K1 as the "old key".

Those skilled in the art will recognize that the described embodiments may be applied to many different applications, such as Transmission Control Protocol (TCP) with MD5 signatures for both Multiprotocol Label Switching (MPLS) Label Distribution Protocol (LDP) and Border Gateway Protocol (BGP), OSPF, Internet Protocol Security (Ipsec) with manual keying, MPLS RSVP Cryptographic Authentication, and Internet Protocol Version 6 (IPV6).

As will be appreciated by those skilled in the art, modifications to the above-described embodiments can be made without departing from the essence of the invention. For example, although the nodes of one embodiment are illustrated with a direct link between nodes A and B (link 16 of FIG. 1), it will be appreciated that the link between nodes A and B is not necessarily a direct link. The link may instead be a multi-hop route spanning one or more intermediate nodes.

As well, it should be appreciated that the present scheme may be employed not only to avoid the rejection of packets during the changing of one key to another key, but also to avoid the rejection of packets during a transition from a non-secure packet network (using no keys) to a secure packet network (using keys) in any of the above embodiments. This would be illustrated, for example, by FIG. 3 if every reference to "K1" in table 300 of FIG. 3 were replaced with "no key".

Such an embodiment would differ somewhat from the above-described embodiments. When the TX key is "no key", outgoing packets do not contain a signature. When the RCV key is "no key", only packets lacking a signature are considered authentic; keys containing a signature are rejected. When the RCV key is "no key or new key", only packets that either lack a signature or contain a signature generated from the newly provisioned cryptographic key are considered authentic. Conversely, the present scheme may be employed to avoid the rejection of packets during a transition from a secure packet network to a non-secure packet network, as would be shown in table 300 if every reference to "K2" were replaced with "no key".

Other modifications will be apparent to those skilled in the art and, therefore, the invention is defined in the claims.

What is claimed is:

1. A method of managing a cryptographic key at a network node, the method comprising:
   (a) upon being provisioned with a new cryptographic key:
      including in outgoing packets a signature generated using a current cryptographic key; and
      treating as authentic both incoming packets containing a signature generated using the current cryptographic key and incoming packets containing a signature generated using the new cryptographic key; and
   (b) upon receipt of a packet containing a signature generated using the new cryptographic key:
      including in outgoing packets a signature generated using the new cryptographic key; and
      treating as authentic only incoming packets containing a signature generated using the new cryptographic key.

2. The method of claim 1, further comprising:
   commencing a delay period upon being provisioned with the new cryptographic key; and
   upon expiry of the delay period and prior to receipt of a packet containing the signature generated using the new cryptographic key:
      including in outgoing packets a signature generated using the new cryptographic key; and
      treating as authentic both incoming packets containing a signature generated using the current cryptographic key and incoming packets containing a signature generated using the new cryptographic key.

3. The method of claim 1, wherein including in outgoing packets the signature generated using the new cryptographic key is conditional on the elapsing of a predetermined time period after receipt of the packet containing the signature generated using the new cryptographic key.

4. The method of claim 1, further comprising, upon being provisioned with a further cryptographic key, using the further cryptographic key as the new cryptographic key.

5. The method of claim 1, further comprising, before any cryptographic key is provisioned:
   omitting from outgoing packets any signature generated using a cryptographic key; and
   treating as authentic incoming packets lacking a signature generated using a cryptographic key.

6. The method of claim 5, further comprising, upon being provisioned with a first cryptographic key until a first packet containing a signature generated using the first cryptographic key is received:
   omitting from outgoing packets any signature generated using a cryptographic key; and
   treating as authentic both incoming packets lacking a signature generated using a cryptographic key and incoming packets containing a signature generated using the first cryptographic key.

7. The method of claim 6, further comprising, after being provisioned with a first cryptographic key and after receiving a first packet containing a signature generated using the first cryptographic key:

including in outgoing packets a signature generated using the first cryptographic key; and treating as authentic only incoming packets containing a signature generated using the first cryptographic key.

8. The method of claim 7, wherein including in outgoing packets the signature generated using the new cryptographic key is conditional on the elapsing of a predetermined time period after receipt of the first packet containing the signature generated using the first cryptographic key.

9. The method of claim 7, further comprising, upon being provisioned with a further cryptographic key, using the further cryptographic key as the new cryptographic key.

10. A node for a packet data network, comprising:

at least one port adapted to receive packets;

at least one port adapted to transmit packets; and a packet processor adapted:

(a) upon being provisioned with a new cryptographic key:

to include in outgoing packets a signature generated using a current cryptographic key; and to treat as authentic both incoming packets containing a signature generated using the current cryptographic key and incoming packets containing a signature generated using the new cryptographic key; and (b) upon receipt of a packet containing a signature generated using the new cryptographic key:

to include in outgoing packets a signature generated using the new cryptographic key; and to treat as authentic only incoming packets containing a signature generated using the new cryptographic key.

11. The node of claim 10, wherein the packet processor is further adapted:

to commence a delay period upon being provisioned with the new cryptographic key; and upon expiry of the delay period and prior to receipt of a packet containing the signature generated using the new cryptographic key:

to include in outgoing packets a signature generated using the new cryptographic key; and to treat as authentic both incoming packets containing a signature generated using the current cryptographic key and incoming packets containing a signature generated using the new cryptographic key.

12. The node of claim 10, wherein the packet processor is adapted to include in outgoing packets the signature generated using the new cryptographic key conditionally on the elapsing of a predetermined time period after receipt of the packet containing the signature generated using the new cryptographic key.

13. The node of claim 10, wherein the packet processor is adapted, upon being provisioned with a further cryptographic key, to use the further cryptographic key as the new cryptographic key.

14. The node of claim 10, wherein the packet processor is further adapted, before any cryptographic key is provisioned:

to omit from outgoing packets any signature generated using a cryptographic key; and to treat as authentic incoming packets lacking a signature generated using a cryptographic key.

15. The node of claim 14, wherein the packet processor is further adapted, upon being provisioned with a first cryptographic key until a first packet containing a signature generated using the first cryptographic key is received:

to omit from outgoing packets any signature generated using a cryptographic key; and to treat as authentic both incoming packets lacking a signature generated using a cryptographic key and incoming packets containing a signature generated using the first cryptographic key.

16. The node of claim 15, wherein the packet processor is further adapted, after being provisioned with a first cryptographic key and after receiving a first packet containing a signature generated using the first cryptographic key:

to include in outgoing packets a signature generated using the first cryptographic key; and to treat as authentic only incoming packets containing a signature generated using the first cryptographic key.

17. The node of claim 16, wherein the packet processor is adapted to include in outgoing packets the signature generated using the new cryptographic key conditionally on the elapsing of a predetermined time period after receipt of the first packet containing the signature generated using the first cryptographic key.

18. The node of claim 16, wherein the packet processor is further adapted, upon being provisioned with a further cryptographic key, to use the further cryptographic key as the new cryptographic key.

* * * * *